Feb. 17, 1942.   G. W. McCULLOUGH   2,273,412
METHOD OF RECOVERING HYDROCARBONS
Filed Sept. 26, 1938
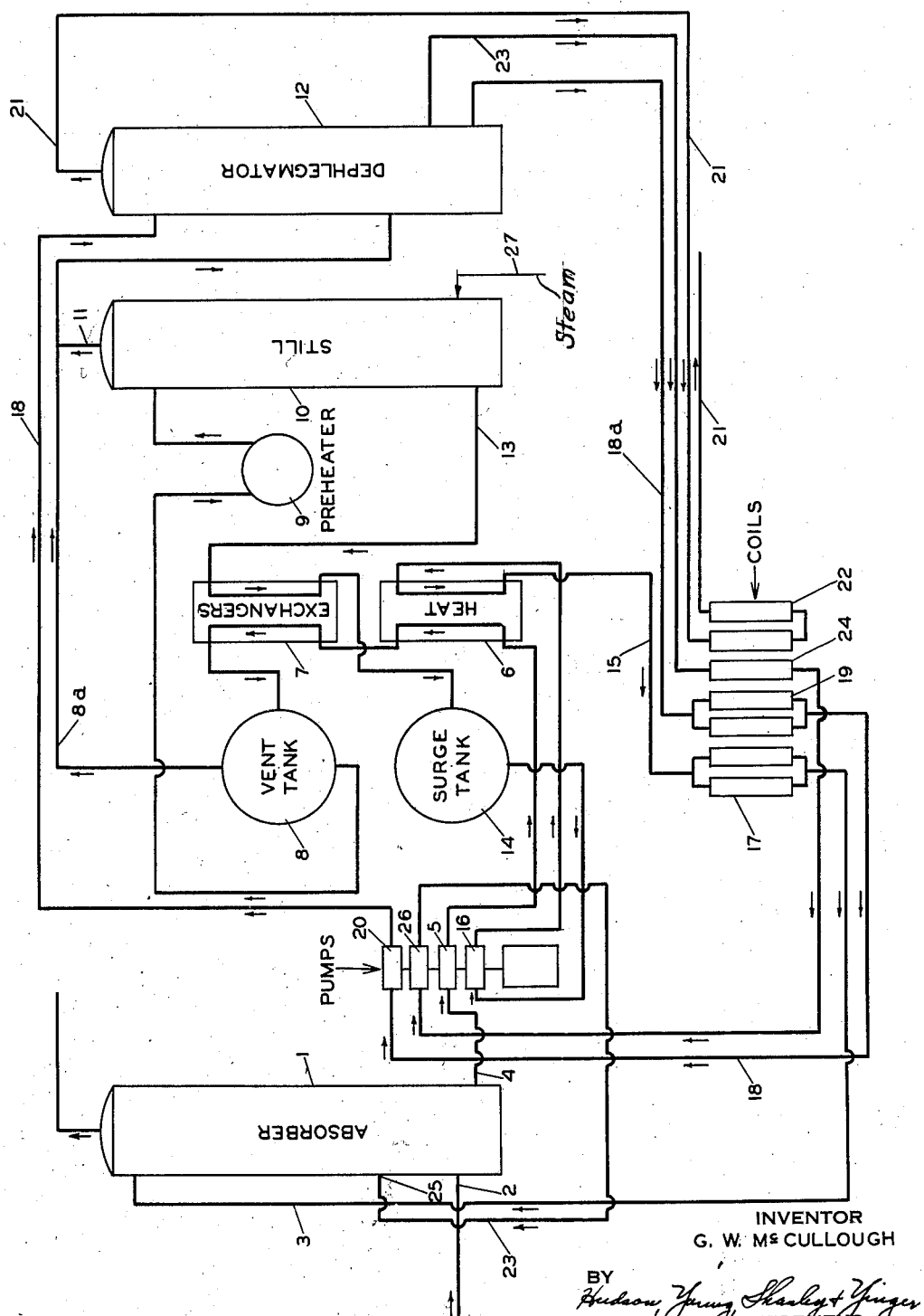
INVENTOR
G. W. McCULLOUGH
BY
ATTORNEYS Patented Feb. 17, 1942

2,273,412

UNITED STATES PATENT OFFICE 2,273,412

METHOD OF RECOVERING HYDROCARBONS

Gerald W. McCullough, Bartlesville, Okla., assignor to Phillips Petroleum Company, a corporation of Delaware Application September 26, 1938, Serial No. 231,820

1 Claim. (Cl. 196—8)

This invention relates to a process of separating gases and vapors by selective absorption. More particularly, this invention relates to a combination absorption system using two absorbents of different molecular weights, one absorbent being the usual mineral seal oil or other conventional absorbent, and the other consisting of the lighter components of new mineral seal oil and the liquefied heavier components of the absorbed gases or vapors.

An important object of the present invention is to provide an absorption process wherein a more complete recovery of the valuable constituents is accomplished without increasing the amount of absorbent or the distillation apparatus.

A further important object of the present invention is to provide an absorption process having two absorbents, one being lighter than the other and being formed of the light ends of the other plus the liquefied heavier constituents of the vapors being recovered.

A further important object of the present invention is to utilize as an absorbent, a liquid, all of which is separated in the dephlegmator of the distillation end of the absorption system cycle and is hereinafter called oil reflux.

In the usual practice of recovering gasoline from natural gas, in which the absorption system comprises the conventional absorber, still, and dephlegmator, the fractions knocked out in the dephlegmator are sent from the dephlegmator back to the still. Thus, a particular advantage of the present system is a utilization of the oil reflux from the dephlegmator for an absorbent instead of just circulating it through the still and dephlegmator, thereby getting more efficient recovery.

Other advantages of the present combination absorption system over the conventional system mentioned above are; greater absorption of valuable light components of the inlet gas because of the increased total oil circulation to the absorber; greater absorption of valuable light components of the inlet gas because of the decreased average molecular weight of the total absorbent; a decrease of oil necessary at the top of the absorber should it be desired to maintain the same absorption of valuable components of the inlet gas, because of the lower molecular weight of the oil reflux used as absorbent; the ease of installation in present plants by the insertion of a pump and cooling coils for the oil reflux; and the ability to be better utilized at plants having fire stills because of the larger amounts of oil reflux at such plants.

Other objects and advantages will appear from the more detailed description of the invention following hereinafter, taken in conjunction with the accompanying drawing, which is a diagrammatic elevation of an apparatus suitable for carrying out the present invention.

In the drawing, 1 denotes an absorber of usual type receiving gas from a line 2. Absorption oil such as mineral seal oil is supplied to the upper part of absorber 1 through a line 3. The enriched absorption oil is run out of absorber 1 through a line 4 and by means of pump 5 is passed through heat exchangers 6 and 7 and discharged into vent tank 8. From tank 8, the rich oil is passed through preheater 9 and into the upper part of a steam still 10. Steam enters still 10 through steam inlet line 27, while the vapors and steam from still 10 pass through line 11 into dephlegmator 12. Vapors that are liberated from vent tank 8 are also passed into dephlegmator 12 through pipe line 8a.

The stripped or lean oil flows from still 10 through line 13, through heat exchanger 7 into lean oil surge tank 14. From tank 14, the lean oil is pumped through line 15 by pump 16, through heat exchanger 6 and cooler 17 to the absorber 1 through line 3.

Water is introduced into the top of dephlegmator 12 through pipe line 18 and withdrawn therefrom by a pipe 18a through cooler 19 by pump 20 and back to the top of the dephlegmator through the pipe 18 thus making a closed circuit. Gasoline vapors are withdrawn from the upper end of dephlegmator 12 through line 21 to condensing coils 22 and then to storage tanks which are not shown.

It will be understood that the system thus far described is the conventional absorption system. It has been customary in using the system described above, to circulate the lighter components of new absorption oil and the liquefied heavier components of the absorbed gases or vapors remaining in the dephlegmator and designated as oil reflux, from the dephlegmator back to the still and dephlegmator again.

Instead of following the above conventional procedure, I have provided a line 23, shown in the drawing, from the lower end of dephlegmator 12 and leading back into absorber 1 at point 25 which is at a lower point in the absorber than the inlet 3 for the lean oil. Interposed in this line is a cooler 24 and a pump 26 for pumping the oil reflux from the dephlegmator to the absorber.

The oil reflux enters the absorber 1 at a point 25 below the top plate of the absorber. This point is chosen such that the composition of the absorbent flowing down through absorber at that point and the composition of the oil reflux are similar with respect to the major heavy constituents to be recovered from the gas. At the top of the absorber, ordinary stripped mineral seal oil (lean oil) enters and flows down the column absorbing vapors or gases rising from the point at which the oil reflux enters. At the point of entrance of the oil reflux, the two streams merge and flow down the remainder of the column, becoming enriched with the gas entering through line 2.

The rich oil then passes through pump 5, heat exchangers 6 and 7, vent tank 8, preheater 9 and into steam still 10. In the still, the freed gasoline vapors or gases, light constituents of the mineral seal oil absorbent and steam pass through the top as vapor to the dephlegmator 12. The hot lean oil leaves the bottom of the still through line 13 and goes through heat exchanger 7, surge tank 14, pump 16, heat exchanger 6, cooler 17 and then to the top of the absorber. The heavier components of the freed vapors or gases and the light constituents of the mineral seal oil or other absorbent are condensed in the dephlegmator, the condensate, being the said oil reflux, flows to the cooling coils 24 and is pumped into the absorber as absorbent again.

While I have shown my invention as embodied in specific form and as operating in a specific manner for the purpose of illustration, it should be understood that I do not limit my invention thereto, since various modifications will suggest themselves to those skilled in the art without departing from the spirit of the invention, the scope of which is set forth in the annexed claim.

I claim:

In the process of extracting heavier constituents from a mixture of gases by selective absorption, the combination of steps comprising introducing absorbent oil to an absorber, contacting the gas with the absorbent oil therein, steam distilling the resulting enriched absorbent oil, passing the vaporous effluent of the distilling step in contact with water to dephlegmate the same to condense fractions having boiling points higher than water, separating the resulting condensate of the dephlegmating step from the water and passing the condensate to the absorber at a point below that at which the absorbent oil is introduced.

GERALD W. McCULLOUGH.